Aug. 22, 1933.    R. G. MILLER    1,923,384
AIRPLANE FUEL TANK
Filed April 26, 1932
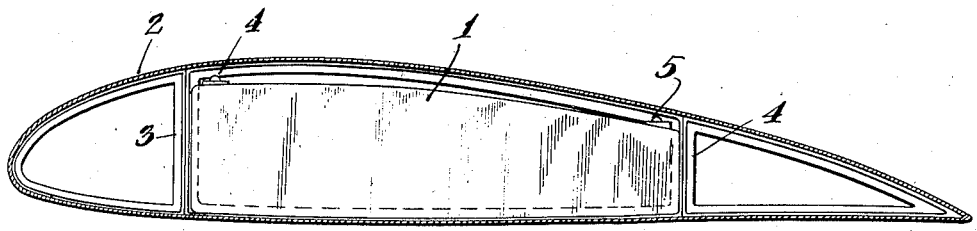
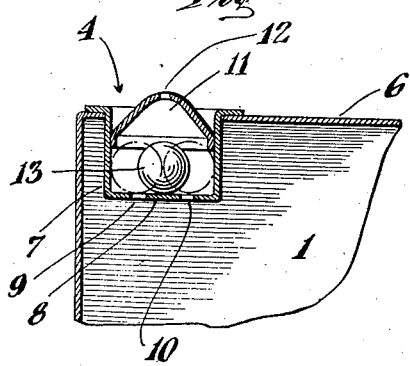
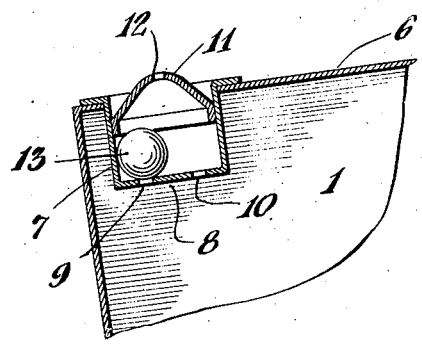
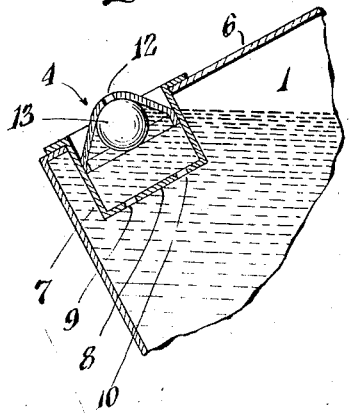
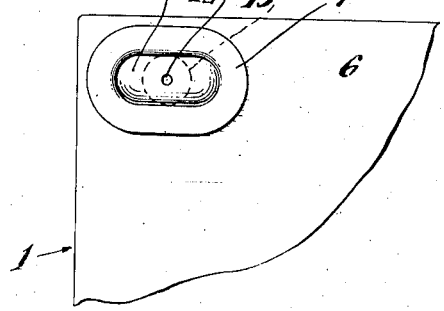
INVENTOR
Roy G. Miller
BY
Hoguet & Neary
ATTORNEYS Patented Aug. 22, 1933

1,923,384

UNITED STATES PATENT OFFICE 1,923,384

AIRPLANE FUEL TANK

Roy G. Miller, Farmingdale, N. Y., assignor to The Aviation Patent and Research Corporation, a Corporation of New York Application April 26, 1932. Serial No. 607,544

2 Claims. (Cl. 244—31)

This invention relates in general to fuel tanks and more particularly to improvements in vents for fuel tanks carried by vehicles.

An object of my invention is to provide a fuel tank vent with a suitable valve means for permitting an efficient vent and at the same time insure against leakage of fuel therethrough from the tank.

A more particular object is to provide an airplane fuel tank with such valved vents so that regardless of the various positions which the airplane may assume the tank will be suitably vented and will be valved against loss of fuel therefrom.

A further object is to provide an airplane fuel tank with such valved vents that closure of the vents for the prevention of fuel spillage and the opening of the vents for venting purposes will be positively and automatically provided for in all positions which the airplane may assume.

It is a still further object to provide such a tank the vents and valves or other spillage prevention means of which may be arranged within the streamline form of the airplane whether the tank be placed in the wing or elsewhere and where the vent will afford proximate rather than remote access to the outside atmosphere.

With the foregoing and other objects in view the invention consists in the combination of parts and in the details of construction hereinafter set forth in the following specification and appended claims, certain embodiments thereof being illustrated in the accompanying drawing in which Figure 1 is a view in longitudinal section through an airplane wing showing a fuel tank arranged therein;

Figure 2 is a view in section taken through one corner of said fuel tank and showing the valved vent therefor;

Figure 3 is a similar view showing the action of the ball valve under a slight tippage of the tank;

Figure 4 is a similar view showing the tank in tipped position and the position of the ball valve in closing the vent;

Figure 5 is a plan view of one corner of the fuel tank.

Referring more particularly to the drawing, I have shown in Figure 1 one form and application of my invention, namely, the provision of suitable vents for airplane fuel tanks which may be carried in the airplane wings.

In this particular showing, it will be seen that the fuel tank 1 is housed within the wing 2 between the limits of the front and rear spars 3 and 4. These vents may be suitably arranged in any position but I prefer in this particular instance to locate one at approximately each of the four corners of the tank. Figure 1 shows vents 4 and 5 which may be duplicated on the other two corners of the tank or substantially near thereto.

Referring to Figure 2, it will be seen that a substantial aperture is made in the upper wall near the corner of the tank and that this upper wall 6 may receive a housing 7 which includes a lower wall 8 with two apertures 9 and 10 providing for communication between the fuel tanks and the housing 7. After the ball valve 13 has been inserted in the housing 7 a substantially conical member 11 may then be inserted in the housing. This member is provided with an aperture 12 so as to provide for communication between the housing and the outside atmosphere. The ball 13 may be made of any suitable light material so that it will freely float and is arranged in the housing so that it will be free to move not only by the force of gravity when the tank is tipped from the position shown in position 2 but also adapted to remove by any moving impulse caused by the surge of fluid.

In the position shown in Figure 2, there is an unhampered vent between the outside atmosphere and the interior of the fuel tank, this being provided for by the aperture 12 and the apertures 9 and 10. Even when the tank is slightly tipped, as shown in Figure 3, the vent is still effective as such, because of the existence of the apertures 10 and 12 which allow atmospheric communication to the interior of the tank. This will be true if the fluid level of the contents of the tank is not such that the fluid will enter a housing 7, in which case as explained before the ball valve will be caused to rise so as to cut off the vent 12.

However, when the tank assumes a position other than upright vertical, such as that shown in Figure 4, it will be seen that the floating of the loosely mounted ball valve causes the latter to move upwardly and cover the aperture 12 so as to close off atmospheric communication in spite of the fact that there is no engagement of the ball with either of the apertures 9 or 10.

It will be understood, however, that if there is an appreciable amount of fluid in the tank, other causes than tipping of the tank may tend toward spillage of fuel, such as a sudden drop, but the floating ball valve acts equally as efficiently in preventing spillage under such circumstances.

I am aware of the fact that it is not new in the art to provide vents for fuel tanks nor is it new in the art to provide ball valves or ball relief valves for taking care of excess steam pressure and for traps and the like. This invention, however, is concerned with a particular problem which is concerned with the provision of a suitable vent for fuel tanks for aeronautical use. In this particular use it is of prime importance that the tank be adequately vented and it is of like importance that such vent shall not be the cause of the spillage of fuel through the vents due to the maneuvering of the airplane. Having these problems in mind, I have sought to produce a suitable valved vent which will accomplish both of these purposes. Moreover in obtaining the desired results, I have succeeded in providing a leak-proof vent by the most simple and effective devices which do not disturb the streamline effect of the airplane and which do not call for any extensive and unreliable remote venting process or construction.

I claim:

1. A liquid containing receptacle having a device for providing a vent and being otherwise closed, said device including a casing carried substantially within said receptacle and having a plurality of vent apertures in its lower wall, the upper portion of said device being of tapered restricted size with a vent aperture in the apex of the tapered upper wall, and a free floating and gravity actuated ball valve element carried freely within said casing.

2. An airplane fuel tank carried within streamline confines of the wing of said airplane and provided with a plurality of spaced vent devices, each of said devices including a casing carried by said tank substantially within the latter, each of said casings having a plurality of spaced vent apertures in its lower wall, the upper portion of the casing being of tapered restricted size with an aperture in the apex of the tapered upper wall, and a free floating and gravity actuating ball valve element carried in said casing so as to open and close each of said vents in accordance with the disposition of said fuel tank during various maneuvers of said airplane for insuring against leakage of fuel from said tank.

ROY G. MILLER.